United States Patent [19]

Larkin et al.

[11] Patent Number: 5,335,296
[45] Date of Patent: Aug. 2, 1994

[54] PROCESS FOR HIGH SPEED RESCALING OF BINARY IMAGES

[75] Inventors: Ross M. Larkin, Rollings Hills; John R. DeAguiar, Sebastopol, both of Calif.

[73] Assignee: Optigraphics Corporation, San Diego, Calif.

[21] Appl. No.: 14,085

[22] Filed: Feb. 4, 1993

Related U.S. Application Data

[63] Continuation of Ser. No. 949,761, Sep. 23, 1992, abandoned, which is a continuation of Ser. No. 693,010, Apr. 30, 1991, abandoned.

[51] Int. Cl.⁵ .................... G06K 9/42; G06F 15/00; G09G 1/06
[52] U.S. Cl. ........................ 382/47; 395/139; 345/127
[58] Field of Search ............. 382/41, 47; 340/731; 395/102, 139; G06K 9/36, 9/42; G06F 15/00; G09G 1/06

[56] References Cited

U.S. PATENT DOCUMENTS

| | | | |
|---|---|---|---|
| 3,976,982 | 8/1976 | Eiselen | 395/139 |
| 4,569,081 | 2/1986 | Mintzer et al. | 382/47 |
| 4,656,664 | 4/1987 | Anderson et al. | 382/47 |
| 4,811,244 | 3/1989 | Shimada et al. | 364/521 |
| 4,855,786 | 12/1989 | Anderson et al. | 382/47 |
| 4,878,183 | 10/1989 | Ewart | 364/521 |
| 4,901,258 | 2/1990 | Akiyama | 364/577 |
| 4,907,284 | 3/1990 | Ohuchi | 340/731 |
| 4,920,504 | 4/1990 | Sawada et al. | 364/521 |
| 4,935,880 | 6/1990 | Kelleher et al. | 364/522 |
| 4,951,230 | 8/1990 | Dalrymple et al. | 364/521 |
| 4,958,302 | 9/1990 | Fredrickson et al. | 364/521 |
| 4,961,153 | 10/1990 | Fredrickson et al. | 364/521 |
| 4,965,751 | 10/1990 | Thayer et al. | 364/521 |
| 4,974,175 | 11/1990 | Suzuki et al. | 364/522 |

OTHER PUBLICATIONS

Tabata, et al., High-Speed Image Scaling for Integrated Document Management, *SIGOA Bulletin*, 1984, pp. 36–45.

Suzuki, et al., A Single Chip Bit-Mapped Image Processor, MN8617, *Proceedings of AFIPS National Computer Conference*, 1985, pp. 279–286.

Eldon, et al., Using the TMC2301 Image Resampling Sequencer, *Microprocessors and Microsystems*, vol. 14, No. 2, Mar. 1990, pp. 107–118.

Weinhaus, et al., A Flexible Approach to Image Warping, *Proceeding of SPIE*, vol. 1244, Image Processing Algorithms and Techniques, 1190, pp. 108–122.

*Primary Examiner*—Jose L. Couso
*Attorney, Agent, or Firm*—Knobbe, Martens, Olson & Bear

[57] ABSTRACT

A system and process for scaling a binary image. The present invention includes a prestored set of scaler, or look-up, tables that each map all combinations of a specified number of input bits into a specified number of output bits. A sequencer is generated to direct the column scaling of the image. The sequencer includes a bit-string wherein each bit specifies the selection by a scaler function of a scaler table allowing interpolation of a preselected scale factor. The sequencer also includes information that allows the efficient processing of image data by aligning processed data on memory boundaries of a computer. The present invention may be used by an image memory management system or an image processing application to rescale images at high speeds on a conventional computer.

18 Claims, 9 Drawing Sheets

Microfiche Appendix Included
(1 Microfiche, 53 Pages)

Scaler Table Construction

| | # INPUT BITS | # OUTPUT BITS | SCALE FACTOR |
|---|---|---|---|
| 4 INPUT BIT/STEP | 4 | 1 | 0.25 (1/4) |
| | 4 | 2 | 0.50 (1/2) |
| | 4 | 3 | 0.75 (3/4) |
| | 4 | 4 | 1.00 (4/4) |
| | 4 | 5 | 1.25 (5/4) |
| | ⋮ | ⋮ | ⋮ |
| | 4 | 16 | 4.00 (16/4) |
| 8 BIT/STEP | 8 | 1 | 0.125 (1/8) |
| | ⋮ | ⋮ | ⋮ |
| | 8 | 16 | 2.00 (16/8) |

Example A: 4 INPUT BITS → 3 OUTPUT BITS

INPUT BIT # → OUTPUT BIT #
- 0 → 0
- 1 → 1 (via OR)
- 2 → 1 (via OR)
- 3 → 2

| IN | OUT | | IN | OUT |
|---|---|---|---|---|
| 0 | 0 | | 8 | 4 |
| 1 | 1 | | 9 | 5 |
| 2 | 2 | | 10 | 6 |
| 3 | 3 | | 11 | 7 |
| 4 | 2 | | 12 | 6 |
| 5 | 3 | | 13 | 7 |
| 6 | 2 | | 14 | 6 |
| 7 | 3 | | 15 | 7 |

Example B: 4 INPUT BITS → 6 OUTPUT BITS

INPUT BIT # → OUTPUT BIT #
- 0 → 0
- 1 → 1
- 2 → 2
- 3 → 3, 4, 5

| IN | OUT | | IN | OUT |
|---|---|---|---|---|
| 0 | 0 | | 8 | 48 |
| 1 | 1 | | 9 | 49 |
| 2 | 6 | | 10 | 54 |
| 3 | 7 | | 11 | 55 |
| 4 | 8 | | 12 | 56 |
| 5 | 9 | | 13 | 57 |
| 6 | 14 | | 14 | 62 |
| 7 | 15 | | 15 | 63 |

PROCESS FOR HIGH SPEED RESCALING OF BINARY IMAGES

This application is a continuation of application Ser. No. 07/949,761 abandoned, filed Sep. 23, 1992, which is a continuation of application Ser. No. 07/693,010 filed Apr. 30, 1991, now abandoned.

MICROFICHE APPENDIX

A microfiche appendix containing computer source code is attached. The microfiche appendix comprises one (1) sheet of microfiche having 53 frames.

BACKGROUND OF THE INVENTION

1. Field of the Invention

The present invention relates to image processing and, more particularly, to the scaling of binary images.

2. Description of the Prior Art

A digital image may be created in a variety of ways including raster scanning a hardcopy document, using an image editor to create a line drawing, using a video frame grabber to capture a frame of a video signal, and so on. The resulting digital image is characterized as binary or continuous tone, as in a gray-scale or color image. Of particular importance to the present invention are binary images which are internally represented in a computer by bit-maps that may be optically perceived as pixels.

There has been much work in the field of image processing to efficiently transform an image by resampling. By resampling an image, a higher or lower resolution image can be made from an existing image. Sampling is the term used for the initial converting of an analog image into a digital image. When an image is resampled, the image may also be rescaled in size by reduction or enlargement. For example, a user of a computer aided design (CAD) system who desires to focus in on a particular feature of a large engineering drawing will use a zoom-in operation to enlarge the selected feature. During the zoom-in operation, the image is resampled to provide an enlarged view of the area of interest.

Unfortunately, the scaling or rescaling of an image carries with it a high computational burden. In fact, the problem of processing video images in real-time has resulted in the design of highly specialized image co-processors such as the TMC2301 image resampling sequencer available from TRW LSI Products. Others, such as Tabata, et al., ("High-Speed Image Scaling for Integrated Document Management", 2nd ACM-SIGOA Conference on Office Information, Jun. 25–27, 1984), have developed designs for sophisticated computer hardware to scale an image. Of course, such specialized hardware can be expensive.

The image scaling design of Tabata, et al., assumes that a scale factor is a rational number of the form M/N, where N is small (16 or 32). A table is constructed with N elements, each containing interpolation coefficients that are used to generate a single pixel by interpolating between the four source pixels that surround the point being resampled. The design is primarily directed to continuous tone images.

Another specialized processor for image scaling is disclosed by Suzuki, et al., ("A Single Chip Bit-Mapped Image Processor, MN8617", National Computer Conference Proceedings, 1985, pp. 279–286). The Suzuki, et al., processor provides word boundary alignment by the use of two barrel shifters. A mapping vector, determined concurrently with the scaling, is used to scale an input image. In addition, the scaling factor is restricted to be a rational number.

Thus, there is now a need for an inexpensive high speed image scaler that can be implemented on a conventional computer without additional specialized hardware. In addition, the image scaler should not be limited to scaling by rational scale factors. Moreover, the desired image scaler should not be overly complicated for an application to binary images. Finally, as the process of scaling binary images has included traditional inefficiencies associated with bit manipulations, what is now desired is an image scaler that can essentially align the input and output bits on specific memory boundaries, such as words, so as to provide more efficient processing.

SUMMARY OF THE INVENTION

The above-mentioned needs are satisfied by the present image scaler invention which includes the off-line generation of scaler, or look-up tables. The memory locations of bits in the image and the scale factor are taken into consideration when the image is scaled. These considerations are reflected in a sequencer data structure that directs the image scaler to interpolate a scale factor from the prestored scaler tables.

Hence, one aspect of the present invention is a system for scaling an image prestored in a memory, comprising: first table generation means for generating a first scaler table having a number of input bits and a first number of output bits wherein each input bit is indicative of a pixel in the image and each output bit is indicative of a pixel in the image after scaling, the first table generation means storing the first scaler table in the memory; second table generation means for generating a second scaler table having the same number of input bits as the first scaler table and a second number of output bits different from the first number of output bits wherein each input bit is indicative of a pixel in the image and each output bit is indicative of a pixel in the image after scaling, the second table generation means storing the second scaler table in the memory; sequencer means for generating a sequencer having a bit string wherein the value of any one of the bits is indicative of either the first or second scaler table, the sequencer having further data indicative of the alignment in the memory of valid bits in the image that may not be completely located within memory boundaries of the memory; and scaler means for selecting the first or second scaler table by reading the bit string of the sequencer and applying only data aligned on memory boundaries to the selected table so that the image is scaled by a preselected scale factor that is interpolated by the selection of the scaler tables.

These and other objects and features of the present invention will become more fully apparent from the following description and appended claims taken in conjunction with the accompanying drawings.

DETAILED DESCRIPTION OF THE PREFERRED EMBODIMENTS

Reference is now made to the drawings wherein like numerals refer to like parts throughout.

Figure 1:
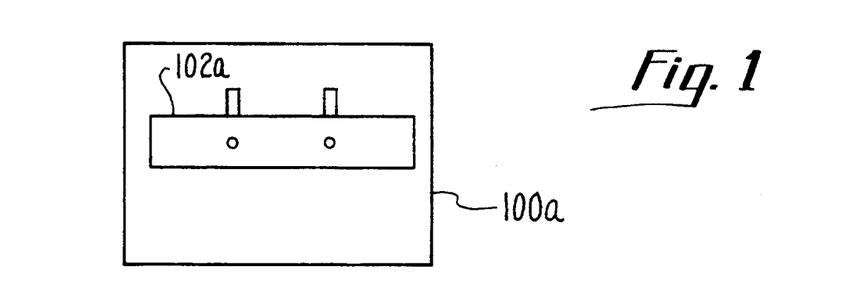
FIG. 1 is an image of a mechanical part.

FIG. 1 illustrates an $8\frac{1}{2}"\times 11"$, A-size mechanical drawing (to scale), or image 100a, of a mechanical part 102a. Of course, other drawings such as, for example, D-size and E-size, and other non-standard size document images, may be scaled by the present invention. Also, other images utilized in image processing systems besides mechanical drawings may be scaled by the present invention including electrical schematics, topographical maps, satellite images, heating/ventilating/air conditioning (HVAC) drawings, and the like.

Figure 2:
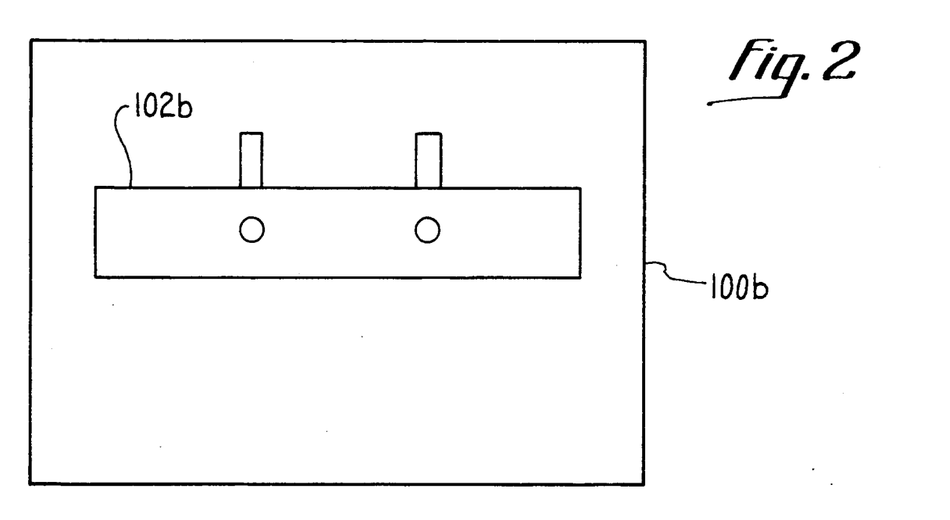
FIG. 2 is an enlarged scale image of the mechanical part shown in FIG. 1.
Figure 3:
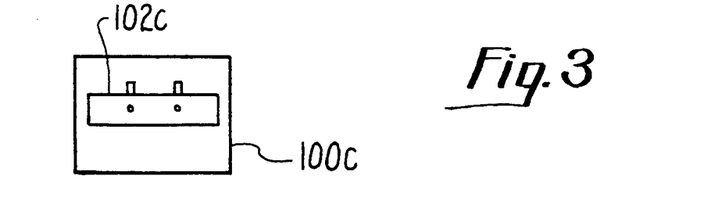
FIG. 3 is a reduced scale image of the mechanical part shown in FIG. 1.

FIG. 2 illustrates an enlarged scale image 100b showing the enlarged scale part 120b corresponding to FIG. 1. FIG. 3 illustrates a reduced resolution image 100c showing the reduced scale part 120c corresponding to FIG. 1.

Figure 4:
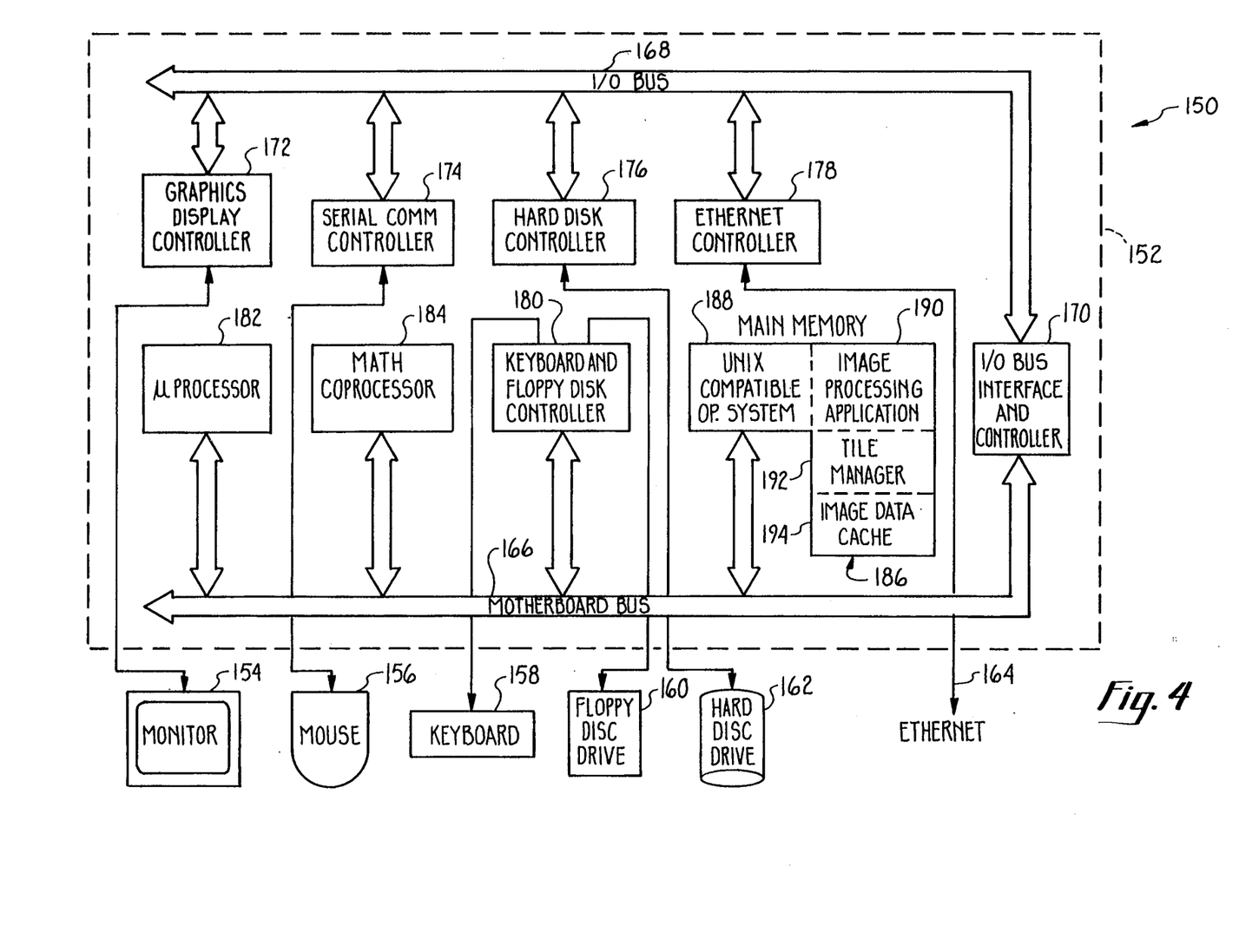
FIG. 4 is a block diagram showing one preferred embodiment of a computer system that includes the present invention.

FIG. 4 illustrates a computer workstation generally indicated at 150 which is representative of the type of computer that is used with the present invention. The workstation 150 comprises a computer 152, a color monitor 154, a mouse 156, a keyboard 158, a floppy disk drive 160, a hard disk drive 162 and an Ethernet communications port 164. The computer 152 includes a motherboard bus 166 and an I/O bus 168. The I/O bus 168, in one preferred embodiment, is an IBM PC/AT ® bus, also known as an Industry Standard Architecture (ISA) bus. The two buses 166, 168 are electrically connected by an I/O bus interface and controller 170.

The I/O bus 168 provides an electromechanical communication path for a number of I/O circuits. For example, a graphics display controller 172 connects the monitor 154 to the I/O bus 168. In the presently preferred embodiment, the monitor 154 is a 19-inch color monitor having a 1,024×768 pixel resolution. A serial communications controller 174 connects the mouse 156 to the I/O bus 168. The mouse 156 is used to, among other things, "pick" an image entity, e.g., the mechanical part 102a (FIG. 1), displayed on the monitor 154.

The I/O bus 168 also supports the hard disk drive 162, and the Ethernet communications port 164. A hard disk controller 176 connects the hard disk drive 162 to the I/O bus 168. The hard disk drive 162, in one possible configuration of the workstation generally indicated at 150, stores 60 megabytes of data. An Ethernet communications controller 178 connects an Ethernet communications port 164 with the I/O bus 168. The Ethernet communications controller 178 supports the industry standard communications protocol TCP/IP which includes FTP and Telnet functions. The Ethernet communications port 164 of the preferred embodiment allows the workstation 150 to be connected to a network which may include, among other things, a document scanner (not shown) and a print server (not shown).

The motherboard bus 166 also supports certain basic I/O peripherals. For example, the motherboard bus 166 is connected to a keyboard and floppy disk controller 180 which supports the keyboard 158 and the floppy disk drive 160. The floppy disk drive 160, in one present configuration, can access floppy disks which store up to 1.2 megabytes of data.

The fundamental processing components of the computer 152 are a microprocessor 182 such as, for example, an 80386 microprocessor manufactured by Intel, a math coprocessor 184 such as, for example, a 80387 math coprocessor also manufactured by Intel and a main memory generally indicated at 186 comprising, for example, 4 megabytes of random access memory (RAM).

The main memory 186 is used to store certain computer software including a Unix compatible operating system 188 such as, for example, SCO Xenix licensed by Santa Cruz Operation of Santa Cruz, Calif., a subsidiary of Microsoft Corporation, an image processing application 190, a tile manager 192, and an image data cache 194. One preferred image processing application 190 includes functions such as zoom and pan which are characteristic of editing and viewing systems for raster images. Another example of an image processing application is a document automation system.

Another presently preferred computer workstation 150 having somewhat different processing components to those just described is available from Sun Microsystems, Inc. of Mountain View, Calif., under the tradename "SPARCstation 1". In such an embodiment, the Unix compatible operating system 188 would be licensed directly from Sun.

Although representative workstations have been shown and described, one skilled in the applicable technology will understand that many other computer and workstation configurations are available to support the present invention.

Figure 5:
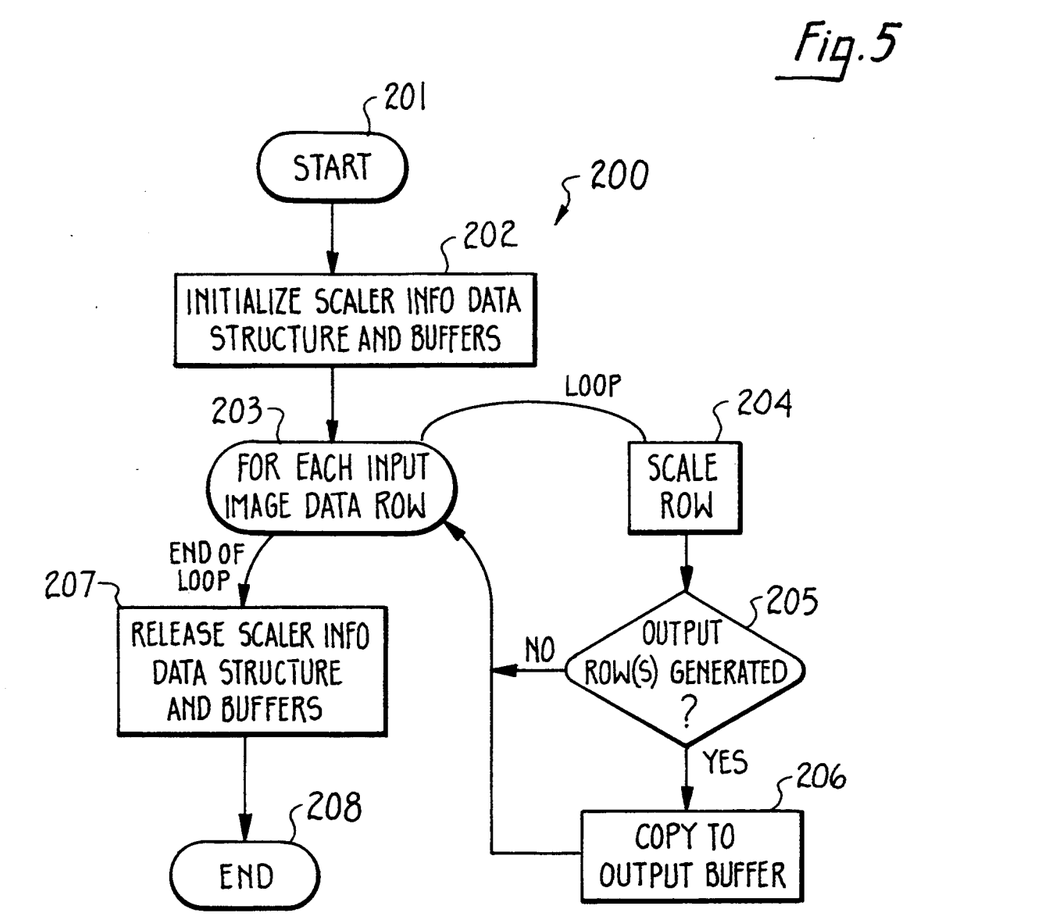
FIG. 5 is a flow diagram of the preferred image scaler of the present invention.

FIG. 5 illustrates the control flow of the preferred image scaler 200 according to the present invention. In the present embodiment, the image scaler 200 is executed on the workstation 150 (FIG. 4) upon the demand of the tile manager 192. (The details of the tile manager 192 are described in applicant's concurrently filed patent application entitled "Image Memory Management System", U.S. Ser. No. 07/694,416, now U.S. Pat. No. 5,263,136). However, in other embodiments, the image scaler 200 can be called directly by the image processing application 190.

Further discussions relating to flow diagrams, herein, will include parenthesized names which correspond to source code functions written in the "C" programming language. The referenced source code functions are attached herewith as source code listings in the Microfiche Appendix. One presently preferred compiler that is used to create object code from the source code of the preferred image scaler 200 is the "C" compiler licensed by Sun Microsystems, Inc. for use with its SPARCstation products. However, one skilled in the technology will recognize that the steps of the accompanying flow diagrams can be implemented by using a number of different compilers and/or programming languages.

The image scaler 200 begins execution at a start state 201 and moves to an "Initialize Scaler Information Structure and Buffers" (InitScaler), or scaler initialization function 202 wherein a portion of the main memory 186 is allocated for a scaler information data structure and buffers, including an input and an output row buffer. The presently preferred scaler information data structure includes the following fields of data described in Table A:

TABLE A a. Pointer to (or address of) an optional scaler input row buffer;
b. Pointer to an optional scaler output row buffer;
c. Number of bits per image pixel (=1 for binary images);
d. Number of input pixels per row of the image (where each row corresponds to a raster scan line on a video display);
e. Bit offset from a double-word boundary to the first input pixel;
f. Number of output pixels to produce per row;
g. Bit offset from a double-word boundary to the first output pixel position;
h. Number of input rows;
i. Number of output rows;
j. Number of rows combined in an input row buffer;
k. Flag indicating a flush buffer condition; and
l. Row and column sequencer data structures as described hereinbelow.

This data structure will be more fully described below in the context of the operation of the present invention.

The processing of the InitScaler function 202 is more fully described below with reference to FIG. 6. Now moving to a loop state 203, the image scaler 200 enters a FOR-loop which is executed for each data row in the image to be processed.

The execution of the FOR-loop proceeds as the image scaler 200 enters the "Scale Row" (FastEnl-Bin8), or row scaler function 204 (described in more detail hereinbelow with reference to FIGS. 9A and 9B) which is the principal scaling function of the image scaler 200. The row scaler function 204 is provided with the memory location of either a row of pixels, or a strip, which is a grouping of adjacent rows. The following discussion will describe the scaling of a single row of pixels. However, from the following discussion, one skilled in the relevant technology will similarly understand the implementation of the row scaler function 204 with respect to a strip.

The row scaler function 204 can produce zero, one or more output rows each time that the function 204 is executed by the image scaler 200. Zero or one output rows of pixel data may result when the image is being reduced, and one or more rows may result when the image is being enlarged. Proceeding to a decision state 205, the image scaler 200 tests the return result from the row scaler function 204 to determine whether one or more output rows were generated. If no output rows were generated by the function 204, then the image scaler 200 returns to the top of the FOR-loop at the loop state 203 and passes the memory location of the next input data row to the row scaler function 204.

On the other hand, if at the decision state 205 it is determined that at least one output row was generated, the image scaler 200 transitions to a state 206, wherein the contents of the scaled output row (i.e., scaled pixel data) are copied into an output buffer. In the case where the image scaler 200 is expanding or enlarging an image, there may be two or more output rows generated for each input image data row. Thus, at the state 206, multiple, duplicate copies of that output row may need to be copied into the output buffer as indicated by the row scaler 204. From the copy buffer state 206, the image scaler 200 returns back to the top of the FOR-loop at the loop state 203.

The image scaler 200 ends, or exits, the FOR-loop when all rows of the input image data have been processed. Thereafter, the image scaler 200 moves to a state 207 where the scaler information data structure and any associated buffers are released, or de-allocated, and then completes at an end state 208.

Figure 6:
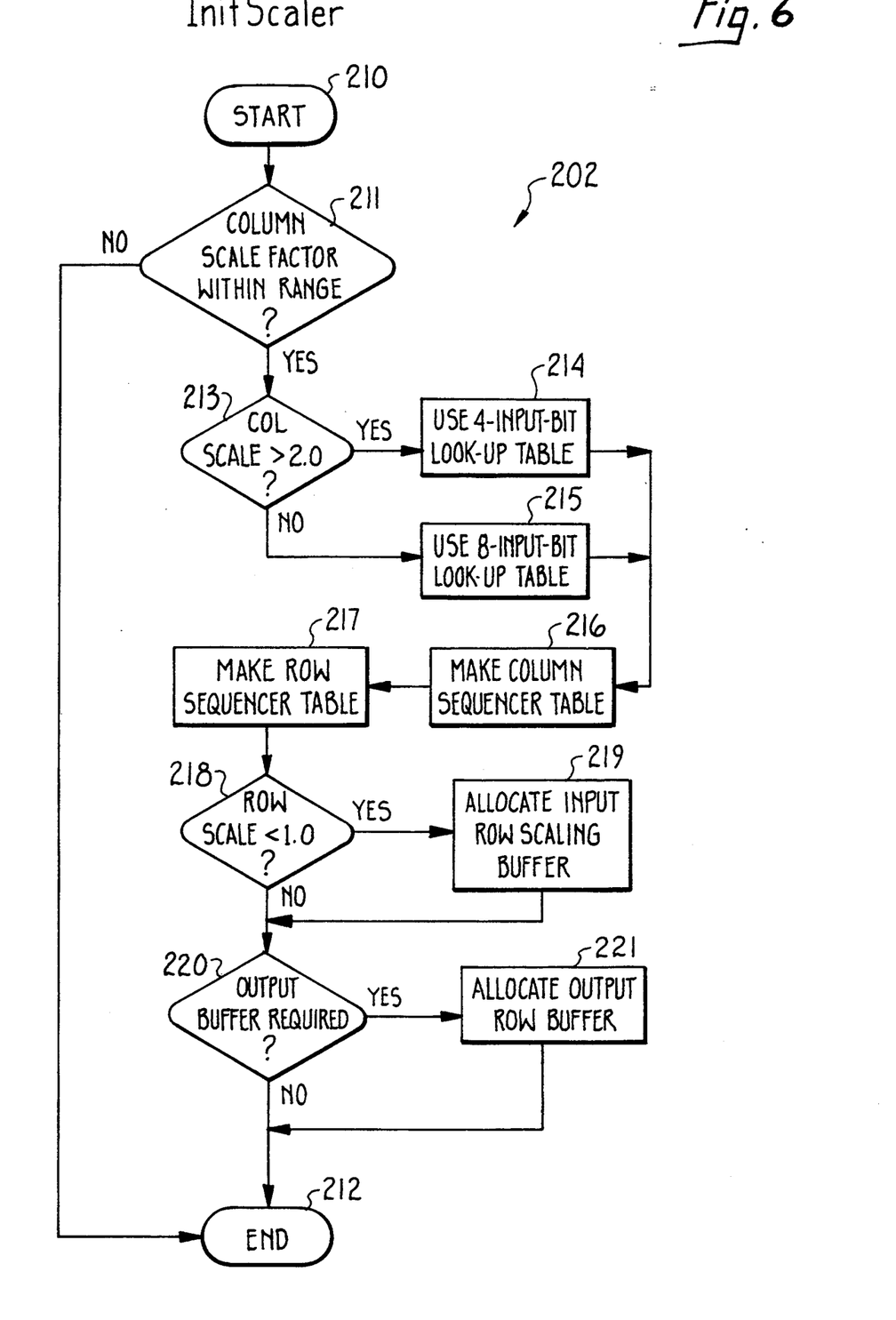
FIG. 6 is a flow diagram of the "Initialize Scaler Information Structure and Buffers" function referred to in FIG. 5.

The control flow for the scaler initialization function 202 is described now by referring to FIG. 6. It should be understood that the following description is for a simplified version of the function 202. The presently preferred implementation of the function 202 covers cases where bit reversal is handled in the course of scaling a row (resulting from certain image processing applications such a horizontal flip or mirror operation). Also scaling is handled somewhat differently while the image is rotated (and otherwise transformed in a coordinate system). However, the flow diagram of FIG. 6 illustrates the core idea behind the table look-up process of the present invention.

The image scaler 200 enters the scaler initialization function 202 at a start state 210 and transitions to a decision state 211 wherein a test is made to determine whether a column scale factor input is within a valid range, e.g., between ⅛ and 4 in the present embodiment. The column scale factor here refers to the scale factor that is applied in the direction of row propagation. In other words, from the perspective of a user viewing the video display 154, (in a conventional display anyway), the column scale factor refers to the horizontal axis. This is the axis in which adjacent pixels appear within each succeeding byte of the image memory 194 (FIG. 4).

In contrast, a row scale factor from the same perspective refers to the vertical axis. The high speed scaling of the present invention applies, in particular, to the processing associated with the column scale factor because it is such a computationally intensive operation due to the extensive bit operations that must be performed. On a conventional computer, such as the workstation 150 (FIG. 4), such computations are often very time consuming. Thus, one of the primary benefits of the present invention is that the amount of bit manipulations required by a conventional computer architecture to resample a binary image are significantly reduced.

Still referring to the decision state 211, if the column scale factor is not in the predetermined valid range then the image scaler 200 terminates processing of the scaler initialization function 202 with an error condition at an end state 212. However, if the image scaler 200 determines that the column scale factor is within a valid range, the image scaler 200 proceeds to a decision state 213 wherein a test is made to determine whether the column scale factor is greater than two. If the column scale factor is greater than two, then the image scaler 200 moves to a state 214 to use a four input bit-per-step look-up table (hereinafter referred to as a "scaler table"). Otherwise, if the column scale factor is less than or equal to two, the image scaler 200 moves to a state 215 to use the eight input bit-per-step scaler table. The details of the construction and structure of the scaler tables are discussed below with reference to FIG. 7.

In FIG. 6, having chosen the number of input bits per step at either state 214 or 215, the image scaler 200 moves to a "Make Column Sequencer Table" (Make-FastRedSequencer) function 216 to construct the column sequencer table. Then, moving to a state 217, the image scaler 200 constructs the row sequencer table. The row sequencer table is not essential to the operation of the image scaler 200 because it is not particularly computationally intensive. However, it is noted that a sequencer similar to the column sequencer is presently preferred for row scaling.

The image scaler 200 continues by moving to a decision state 218 wherein a test is made to determine whether the row scale factor is less than one. If the row scale factor is less than one, that indicates that some adjacent rows are combined and the vertical dimension of the image will be reduced. In order to reduce the image in the vertical dimension, the image scaler 200 requires an input row scaling buffer to hold intermediate scaling results, and such a buffer is allocated from the memory 186 (FIG. 4) at a state 219.

If, however, it is determined at the decision state 218 that the row scale factor is greater than or equal to 1.0 then an input row scaling buffer is not allocated. The image scaler 200 then moves to a decision state 220 and tests whether an output buffer is required. An output buffer is required in many situations where the row scale factor is greater than 1.0, in which case the image scaler 200 may need to hold a copy of a row that is generated so as to thereafter make multiple copies of the row. Another situation where an output buffer may be required is if there is a special pixel operation, (e.g., some applications require the use of a logical exclusive-OR operation for an "undo" or for image inversion), that is supposed to be applied when writing to the output buffer. In either case, if an output buffer is required, it is allocated by moving to a state 221 and then the scaler initialization function 202 is completed at the end state 212.

Figure 7:
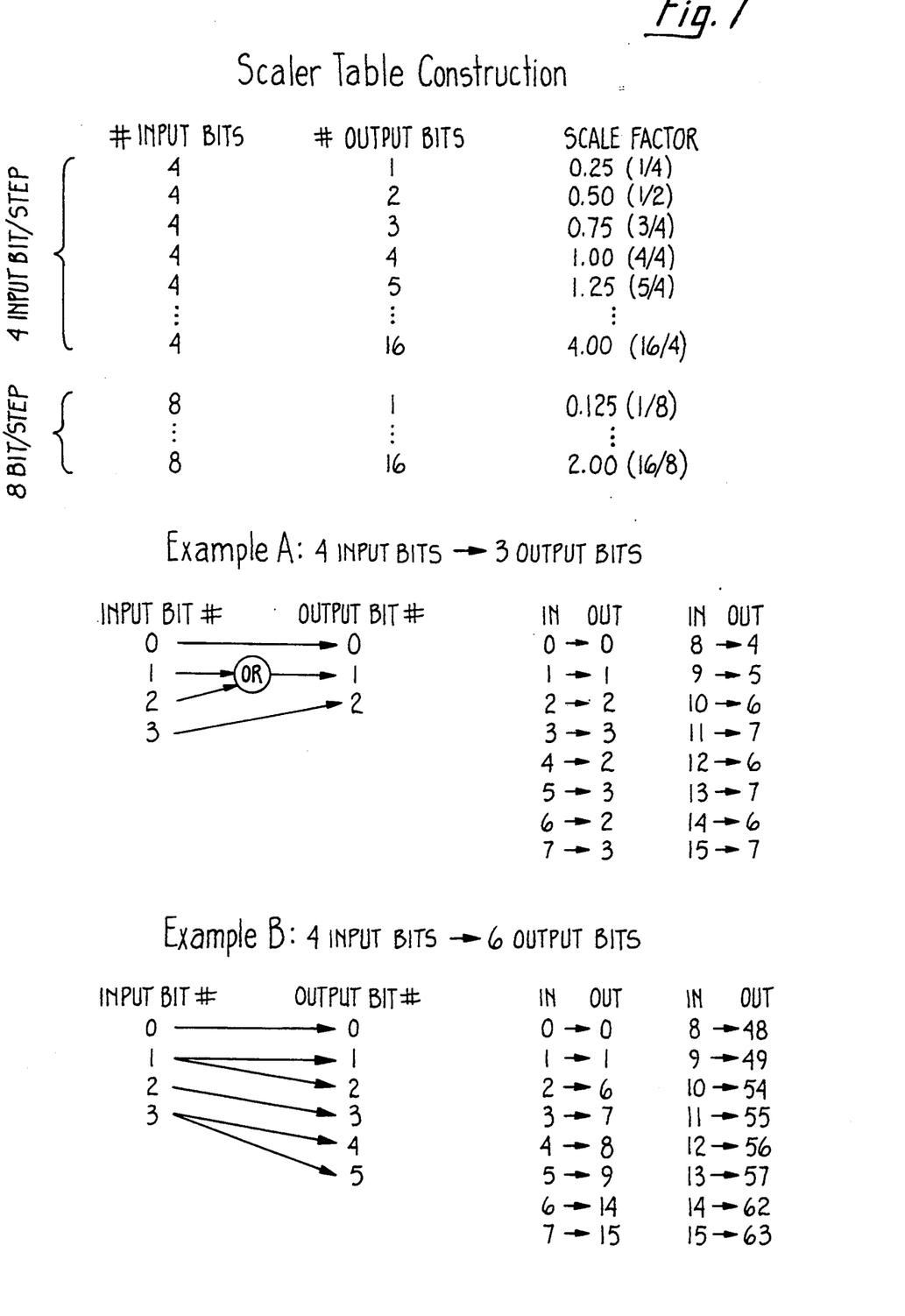
FIG. 7 is a set of tables and diagrams illustrating the construction of the look-up tables used by the preferred image scaler.

FIG. 7 begins with a diagram showing scaler table construction. A table is illustrated that has the headings Number of Input Bits (or "#Input Bits"), Number of Output Bits (or "#Output Bits") and "Scale Factor" and listed there are two groupings by number of input bits. The first grouping represents entries in the four input bit-per-step scaler table. All of those entries take four input bits and they result in the output of from one to sixteen output bits. Each set of input bit versus output bit pairs (e.g., 4:1, 4:2, 4:3, . . .), which represents a particular scale factor, requires a separate unique scaler table.

To scale by scale factors where a unique scaler table does not exist, the image scaler 200 interpolates between the scale factors that are shown in the third column, by alternating between two adjacent scaler tables. Taking a specific scale factor as an example, suppose that the image scaler 200 is directed to scale a row of pixels by a scale factor of $\frac{1}{3}$, or 0.3333, the image scaler 200 will bounce back and forth between the four-to-one table and the four-to-two table. The way that the image scaler 200 bounces back and forth between those table is determined, or is set, in the sequencer that is generated by the "Make Column Sequencer Table" function 216 which will be further discussed with respect to the flow diagram of FIGS. 8a,b.

Referring to FIG. 7, below the table are Examples A and B. Example A shows what the table looks like for taking 4 input bits and producing 3 output bits. Such use indicates an image reduction. A diagram shows input bit number and output bit number. First the value of input bit 0, i.e., "1" or "0", is written into output bit 0. Now, whatever values appear in input bit 1 and input bit 2 are combined using the logical-OR operation. That is, if either one of bits 1 or 2 is "1" (the equivalent of a pixel being "ON"), output bit 1 is set to "1". Similarly, if both input bits 1 and 2 are "0" then output bit 1 is set to "0". Finally, input bit 3, whatever the value, is written directly into output bit 2. Thus, Example A shows the technique used to take four input bits and produce three output bits.

The actual scaler table for four input bits mapping to three output bits is shown next to the diagram. The table shows the numerical value of each permutation of input bits and which numerical value of output bits it maps to. The four bits can be read as a binary nibble, and in this case, if all four bits are "0", then the output of the scaler table has value "0". If the input has value "1", that means that only bit 0 of the input nibble is turned on. Also, if there is an input value of "1", then the output value is "1" because bit 0 of the output is on while the rest are off.

In the scaler table, the way of assigning numerical values to the input and output is done by numbering the bits from the least significant bit (LSB) towards the most significant bit (MSB). Looking at the scaler table of Example A, input bit number 0 corresponds to $2^0$ (or 1). Input bit number 1 corresponds to $2^1$ (or 2). Input bit number 2 corresponds to $2^2$ (or 4). Lastly, input bit number 3 corresponds to $2^3$ (or 8). The same bit assignments apply to the output of the scaler table.

A larger input value for the scaler table is six, for example. A value of six corresponds to both bits 1 and 2 being "1" and bits 0 and 3 being "0". From the diagram in Example A of FIG. 7, when bits 1 and 2 are "1", when either one of them is "ON", bit number 1 of the output is turned "ON" yielding an output value of "2".

Example B shows how four input bits are used to produce six output bits for an image enlargement. The diagram and scaler table in Example B shows that input bit 0, whatever the value, gets written directly into output bit 0. However, input bit 1, whatever the value, gets written into both output bits 1 and 2. Input bit number 2 is copied directly into output bit 3 and finally input bit 3 is duplicated and written into output bits 4 and 5. Hence, two of the input bits are duplicated and two are copied directly. In this way, the four input bits are expanded to six output bits.

Again, for Example B, the scaler table on the right shows the numerical values that actually make up the table. The same process here can be carried out for eight input bits-per-step. The resulting tables for eight input bits contain 256 entries as opposed to only 16 entries for the four input bit per step, but the idea is the same. The way these correspondences between input bit and output bit are created is thus by distributing the scaling or the enlargement as evenly as possible within the word. For example, in Example B, taking four input bits and creating six output bits, the technique alternated which input bits got duplicated and which did not. It would be incorrect to, for example, duplicate both input bits zero and one. That is, create four output bits from the first two output bits and then not duplicate the last two input bits, just replicate them. In a statistical sense, that does not distribute the scaling over the input bit nibble properly.

It will now be seen that the eight input bits-per-step and the four input bits-per-step scaler tables overlap over a considerable range of scale factors. The eight input bits-per-step scaler table will provide a maximum reduction using a scale factor of 0.125 (or 1:8) whereas the four input bits-per-step scaler table will provide a maximum reduction using a scale factor of 0.25 (or 1:4). Thus, the eight bit per step table can achieve smaller reductions. On the other hand, assuming a limit of sixteen bits in the output per step, the four input bit per step table provides a maximum enlargement using a scale factor of 4 (or 4:1), whereas the eight bit per step table provides for a maximum enlargement using a scale factor of 2 (or 2:1).

One set of tables, four bit-per-input, or eight bit-per-input, is chosen over the other according to time and space requirements. Normally, except for enlargements greater than 2:1, the eight bit tables are preferred over the four bit tables since twice as much input data is processed during each table look-up. However, since each eight bit table is sixteen times larger than each four bit table, space limitations inside the underlying computer 150 (FIG. 4) may require more frequent use of the four bit tables.

The limitation of a maximum enlargement is established by the fact that the presently preferred embodiment includes sixteen output bits in the scaler tables. The sixteen bit output is selected purely as a consideration of memory space and access efficiencies. Larger scaler tables having larger entries in the table could also be used so that the four input bit per step table could conceivably provide up to an 8:1 enlargement and the eight bit per step could provide up to a 4:1 enlargement if a 32 bit table entry size was used, and so on for even larger output bit sizes.

Figure 8A:
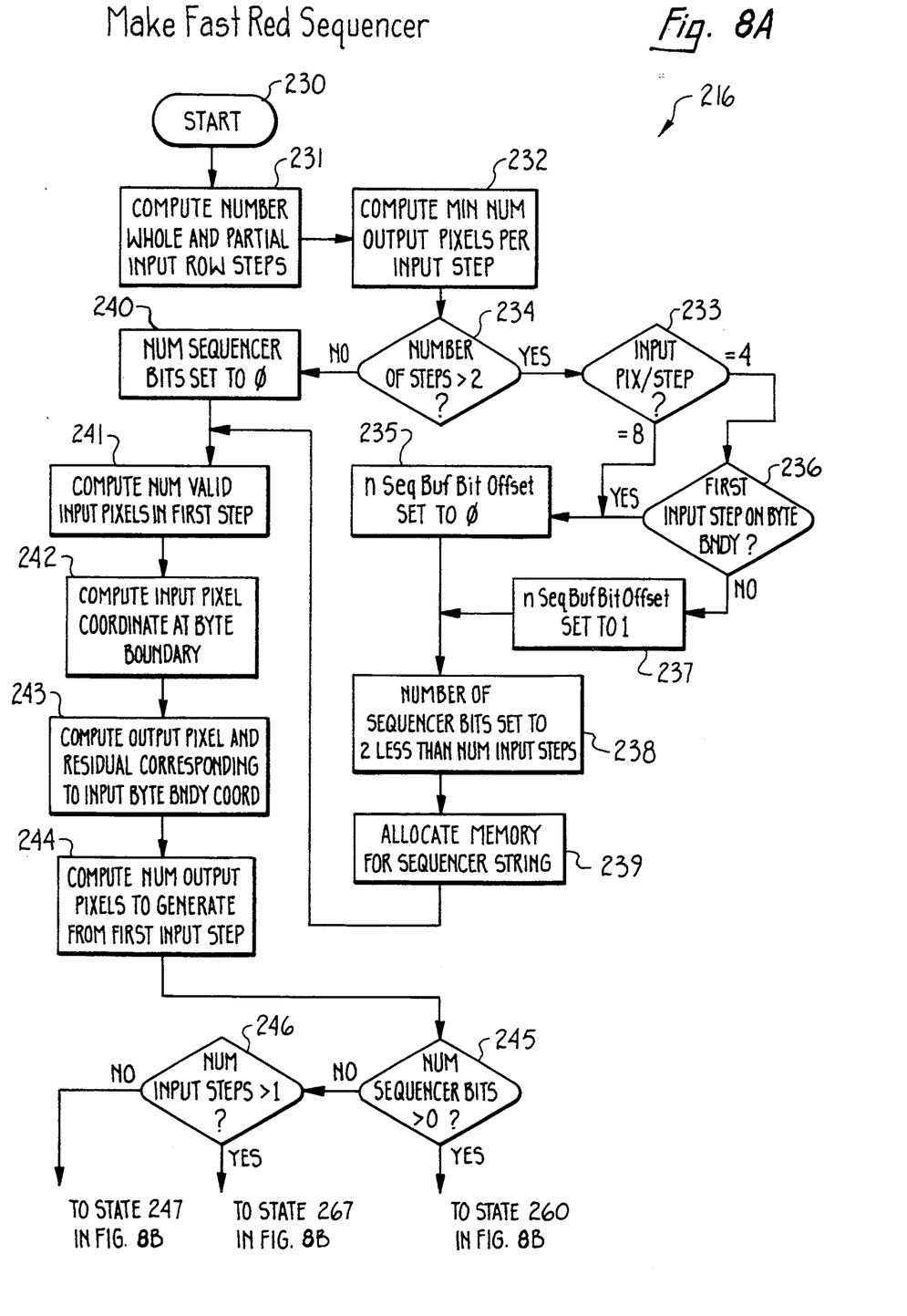
FIGS. 8A and 8B are a flow diagram of the "Make Column Sequencer Table" function referred to in FIG. 6.
Figure 8B:
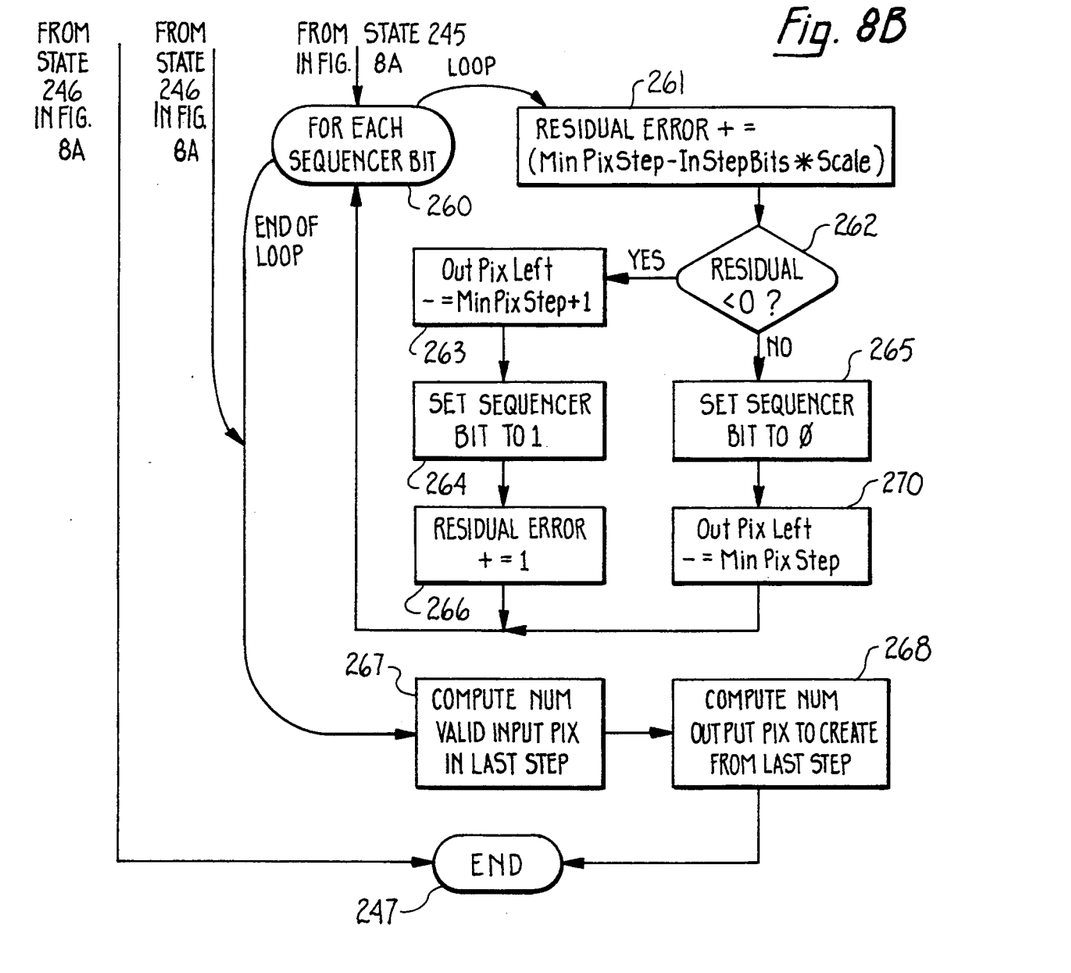

Reference is now made to FIGS. 8A,B which illustrate the control flow for the "Make Sequencer Table" (MakeFastRedSequencer) function 216 referred to in FIG. 6. The function handles both the reduction and enlargement of binary images using the scaler tables thus described. The sequencer function 216 is preferably a program that creates a data structure for the image scaler 200 to step through. The sequencer 216 basically tells the image scaler 200 which scaler table to use at each step in order to give the proper overall scale factor for the input row of the image. As was previously discussed, the image scaler 200 interpolates to any scale factor by switching between the scaler tables.

Now, a value N (also called MinPixStep) is defined to be the largest integer smaller than the product of the scale factor and the number of bits-per-input step. N will be the number of output bits in a table and thus is used to select the appropriate scaler table. For example, suppose that the requested scale factor is ⅓ and the number of bits per step is 4, that is, the image scaler 200 is using the four input bit- per-step table, then ⅓×4 is 4/3 or 1.333, and the largest integer smaller than 1,333 is 1. Therefore, in the example, N would be equal to 1.

The sequencer 216 will direct the scaler 200 whether to use the table of four to N, which in this case is 1, or four to N+1, which would be the four to two table. That is, the table for mapping four input bits to one output bit, or four input bits to two output bits.

The sequencer 216 is entered by the image scaler 200 at a start state 230. Proceeding to a state 231, the number of whole and partial input row steps is calculated. A step is defined as the number of input bits that are appropriate to the table. To simplify the following discussion, an input step is assumed to be eight input bits, or one byte of input data per step.

One critical concept of the image scaler 200 is that the input steps are always aligned on convenient boundaries for the computer to access. In this way, inefficient bit manipulations, such as shift operations, may be substantially avoided. Thus, if the image scaler 200 is using the eight bit per step table, the input is aligned so that it begins at the natural memory alignment of the computer, e.g., a byte boundary. This is true even if the first input bit to use is not the first bit in the byte. Hence, a partial input row step would be a byte or a nibble, say, that contains some invalid pixels (in a binary image each pixel on a video display can be defined as a single bit), but also contains some pixels that were required for the output.

The image scaler 200 next transitions to a state 232 wherein the minimum number of output pixels-per-input step, N, is calculated. Moving to a decision state 234, the image scaler 200 tests whether the number of steps, the number of whole or partial input row steps, is greater than 2. If the test is positive, the image scaler 200 moves to a decision state 233.

At this point (state 233), the sequencer 216 must make a distinction between which of the two sets of tables that the image scaler 200 will be using. If the scaler 200 is using the four input bit-per--step table, then the image scaler 200 moves to a decision state 236, and tests whether the first input step is on a byte boundary. If the test fails, then the sequencer buffer bit offset (nSeqBufBitOffset) is set to "1" at a state 237. This causes the sequencer string to start on a byte boundary that is coordinated with the input row data.

Returning in the discussion back to the state 233, if the image scaler 200 is using eight input bits-per-step, it proceeds directly to a state 235 wherein the sequencer bit offset (nSeqBufBitOffset) is set to "0". Now moving to a state 238, the image scaler 200 calculates and sets the number of sequencer bits in the sequencer structure to two less than the number of input steps. The number of input steps was calculated in state 231.

The image scaler 200 proceeds to a state 239 to allocate memory for the sequencer string and then moves to a state 241. If back at the decision state 234, the number of steps was less than two then the image scaler enters a state 240 and sets the number of sequencer bits to "0", and via an alternate path, moves to the state 241.

Now, at the state 241 the number of valid input pixels (or bits) in the first input step is calculated by the image scaler 200. The first valid input pixel may not, and often is not aligned with the input byte boundaries or input nibble boundaries, and so, some number of bits in the first step are not valid and the number of valid pixels is calculated here. Transitioning to a state 242, the image scaler 200 backs up to the nearest byte boundary that precedes the first valid input pixel (bit).

Then, at a state 243, the image scaler 200 calculates the output pixel and a residual error that corresponds to the pixel at that byte boundary. The residual error is the same as that calculated in the Bresenham algorithm, as described in the textbook by A. Rosenfeld and A.C. Kab, Digital Picture Processing, Academic Press, 1976. It simply indicates the deviation between the ideal position for the output pixel to be and the ideal position at which a given input pixel would be mapped to the output coordinate system, assuming that the output coordinate system is a continuous system. That is, the residual error is the discrepancy between that point and the actual point that is fixed by the granularity or the pixelation of the output row. The residual is incremented by ½ to effectively round to the nearest pixel in later calculations.

The image scaler 200 now moves from the state 243 to a state 244. At the state 244, the image scaler 200 calculates the number of output pixels to generate from the first input step since only some number of the input pixels in that first step are valid. Thus, this is a calculation to obtain the number of valid output pixels that will be produced as a result of that operation. Proceeding to a decision state 245, the image scaler 200 tests whether the number of sequencer bits is greater than "0".

Now referring to FIG. 8B, if the number of bits is greater than zero, at the state 245, the image scaler 200 moves to a loop state 260. If, however, the number of sequencer bits is zero, then the image scaler 200 moves to a decision state 246 to test whether the number of input steps is greater than one. If the number of input steps is greater than one, the image scaler 200 proceeds to a state 267; otherwise, if number of input steps is 1, the image scaler 200 terminates at an end state 247 with an output sequencer that handles just one input step and produces some number of bits of output bits from that single step.

Referring to the loop state 260, the state is the beginning of a FOR-loop for each sequencer bit. Proceeding to a state 261, the residual error is incremented by the difference between the minimum pixels per step "N" (or MinPixStep) and the number of bits per input step (InStepBits) times the scale factor. Now, taking an example, assume that the scale factor is 0.7. The eight input bit-per-step table is used and therefore the MinPixStep is 5. Then the increment is 5-8×0.7, with the result being −0.6. Thus, a value of −0.6 is added to the residual error for each step we take in the FOR-loop.

The image scaler 200 then moves to a decision state 262 to test whether the residual is less than zero at this point. If the residual is not less than zero, the particular sequencer bit is set to zero (i.e., the sequencer is a data structure that includes an array of bits) at a state 265. Then, at a state 270, the image scaler 200 decrements the number of output pixels left by the MinPixStep, (called N above), and then image scaler 200 returns to the top of the FOR-loop at the loop state 260.

On the other hand, if at the state 262, the image scaler 200 determines that the residual is less than zero on this step, a transition is made to a state 263 wherein the number of output pixels left is decremented by MinPixStep+1, which would be N+1. Moving to a state 264 the particular sequencer bit is set to one, and the residual error is incremented by one. Then the image scaler 200 continues back at the top of the FOR-loop at the loop state 260. The FOR--loop is executed for each sequencer bit. Once the FOR-loop is complete, the image scaler 200 moves from the loop state 260 to the state 267. The state 267 is also reached from the state 246 as previously discussed. At the state 267 the number of valid input pixels in the last input step is calculated. Moving to a state 268 the number of output pixels to create from the last step is calculated. Now this is similar to the operation that was performed for the first input step. The image scaler 200 terminates the sequencer function 216 normally at the end state 247.

The following discussion is a description of the sequencer data structure. The included data elements are the number of valid input bits in the first step, the number of valid output bits to be produced in the first step, and a flag indicating which of the two scaler tables to use for the first step. The flag is an indicator as to whether the image scaler 200 should use the N output bit table or the N+1 output bit table. The value of N is fixed at the higher level scaler information structure. In the sequencer data structure, the same three fields as the three fields associated with the first step are provided for the last step, and these last step fields follow the first step fields. That is, the number of valid input bits in the last step, the number of valid output bits to be produced in the last step and a flag indicating which table to use for the last step. The next field is "N", also called MinPixStep was previously discussed with respect to state 232 in FIG. 8A. The next field in the sequencer structure is the scaling domain, which is either a reduction, an enlargement or a one-to-one copying operation. After the scaling domain is the number of sequencer bits, which is exactly the number of input steps minus two because the first step and the last step are handled as special cases because they may be partial steps.

The next field in the sequencer data structure is the bit offset to the first valid sequencer bit. This field is used to coordinate the bit alignment of the sequencer string itself with the input row data. It is convenient and expeditious to make the sequencer string and the input row data cross byte boundaries at the same time.

Finally, the sequencer data structure contains a pointer to the array of sequencer bits and then there is one sequencer bit per non-boundary input step, i.e., exactly the number of sequencer bits.

In summary, the presently preferred sequencer data structure which is output by the sequencer function 216 is as follows in Table B:

TABLE B

A. Number of valid input bits in first step;
B. Number of valid output bits in first step;
C. Flag indicating which table to use for the first step;
D. Number of valid input bits in last step;
E. Number of valid output bits in last step;
F. Flag indicating which table to use for the last step;
G. "N" = floor(scale x input bits/step) (MinPixStep);
H. Scaling domain (Reduction, One-to-One, Enlargement);
I. Number of sequencer bits (=Number of input steps - 2);
J. Bit offset to first valid sequencer bit; and
K. Pointer to array of sequencer bits (one sequencer bit per non-boundary input step).

An example sequencer bit-string, the array pointed to by field (K), may look as follows:

"0 1 1 0 1 0 1 1 0 1 0 1 1 ..."  (1)

The example further assumes a scale factor of exactly 0.7. This is a reduction, and the image scaler 200 uses the eight input bit-per-step table so N will be five in this case. Thus, N is the floor of 0.7×8=5.6, and the floor of 5.6 is 5. The example sequencer string (1) is therefore the pattern of sequencer bits that would be generated for the assumed scale factor and number of input bits per step. A sequencer bit value of "0" directs the image scaler 200 to use the N output bit per step table and a bit value of "1" directs the image scaler 200 to use the N+1 output bit step per table.

At this point, it will be helpful to review the scaler information structure, as itemized above in Table A. The scaler information structure is a higher level data structure that contains a sequencer structure. The data elements include a pointer to the optional scaler input row buffer (a), which was briefly introduced above. The scaler input row buffer is used when the image is being reduced in the vertical dimension. The preferred implementation combines adjacent rows together and then scales the combined row in the horizontal dimension. If the image scaler 200 is enlarging the image, then a scaler input buffer is not necessary. Whatever buffer contains the data can be used in place.

The next element (b) is a pointer to the optional scaler output row buffer. The output row buffer is used when there is a special pixel operation (e.g., the logical exclusive-OR operation) that needs to occur before the scaled image is saved. It is also used when enlarging in the vertical dimension so as to save the row that needs to be copied multiple times. If the image scaler 200 is performing a reduction, or a one-to-one operation, often the scaler 200 will write directly to the final destination buffer, thus saving a copy operation.

The next field (c) is the number of bits per image pixel and for binary images there is one bit per pixel. The next field (d) is the number of input pixels per row. Next, the field (e) is the bit offset from some double-word boundary. The double-word boundary is a 32 bit word boundary to the first valid input pixel. In most conventional computers, addressing can only refer to either byte boundaries, or word boundaries which are 16 bits, or double-word boundaries which are 32 bits. In one preferred computer, the bit offset is from the nearest double-word boundary to the first valid input pixel since addressing is most efficient in double-word mode.

The next fields (f) and (g) are the number of output pixels to produce per row and the bit offset to the first output pixel position. The bit offset (g) is similar in concept to the bit offset for the input. Following those are the fields (h) and (i), the number of input rows and the number of output rows to produce.

The next field (j) is the number of rows combined in the input row buffer, or the number of rows pending. When the image scaler 200 is reducing in the vertical direction, the rows are combined together before any reduction or enlargement in the horizontal direction. For example, suppose that the image scaler 200 is reducing by a factor of four in the vertical direction. Therefore, four input rows must be combined to produce a single output row. Each time the scaler is called with an input row, that input row is combined with the input row buffer and rows pending variable is incremented by one. This is done until the rows pending variable equals the number of rows that are to be combined, or four in the example. Then the horizontal scaler is used to generate an output row.

The rows pending variable is a counter that is useful to maintain state information if the image scaler 200 is interrupted. When an interruption is complete, the image scaler 200 can use this variable to return to its previous state, before it was interrupted.

The next field (k) is a flag indicating the flush buffer condition. The flag is set to true on the last pass through the scaler so that any pending data will be written out or scaled in the horizontal dimension and finally written out.

The last field (l) is two sequencer structures. In the presently preferred implementation, a sequencer structure is used for the row scaling, that is, the vertical dimension scaling, as well as the column or horizontal scaling. However, it is not used in the same way for the row scaling as in the column scaling, and in fact, use of the sequencer is not particularly critical for the row sequencing or for the row scaling because the row scaling is not very computationally intensive. A simple Bresenham algorithm can be used for the row scaler. Therefore, the details of how the row sequencer is constructed are not discussed herein.

The column sequencer is an extension of Bresenham's algorithm to multiple input bits per step, thereby eliminating the execution of Bresenham's algorithm for every pixel in every row which is a tremendous amount of computation during the scaling operation. For the column sequencer, the sequencer data structure is an important part of the invention.

It should be mentioned that other implementations of the sequencer function 216 have also been considered. Indeed, in another preferred embodiment, the sequencer is implemented as a "compile on the fly" process wherein the sequencer directly generates executable machine code that is analogous to, but more efficient than, the scale row function 204 (described with respect to FIG. 9). The efficiency gain may be likened to the difference between an "interpreted" version of a computer language, such as BASIC, and its faster compiled version siblings. One skilled in the technology will understand the direct machine code implementation of the sequencer given the present disclosure of the invention.

Although, in general, the direct machine code implementation may be more efficient than the bit-string production implementation as shown in FIG. 8, it is likely not as portable or maintainable. In addition, the bit-string production implementation may be made more efficient by a simple circuit that could be made to execute the sequencer bit-string.

Figure 9A:
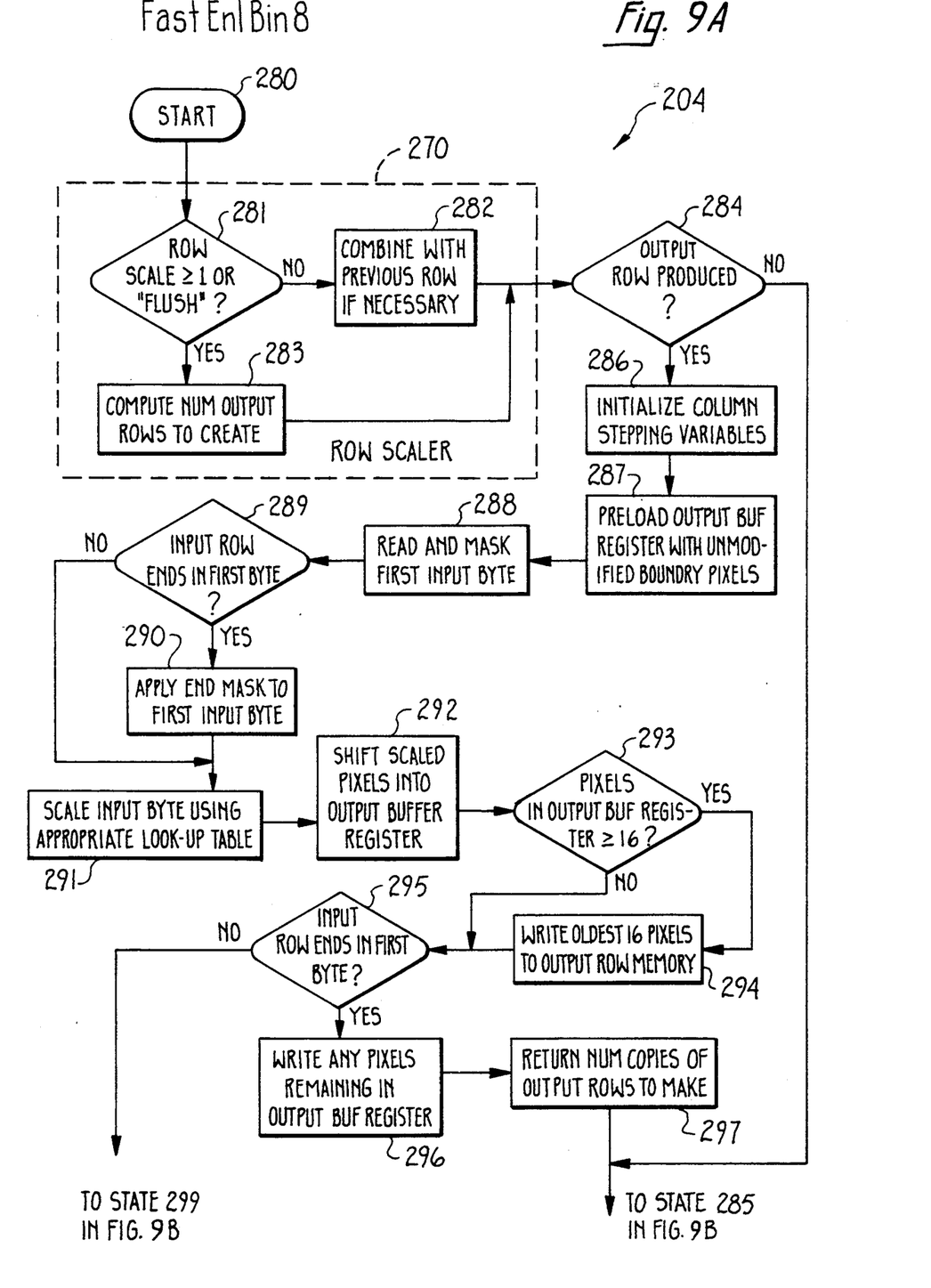
FIGS. 9 and 9B are a flow diagram of the "Scale Input Row" function referred to in FIG. 5.
Figure 9B:
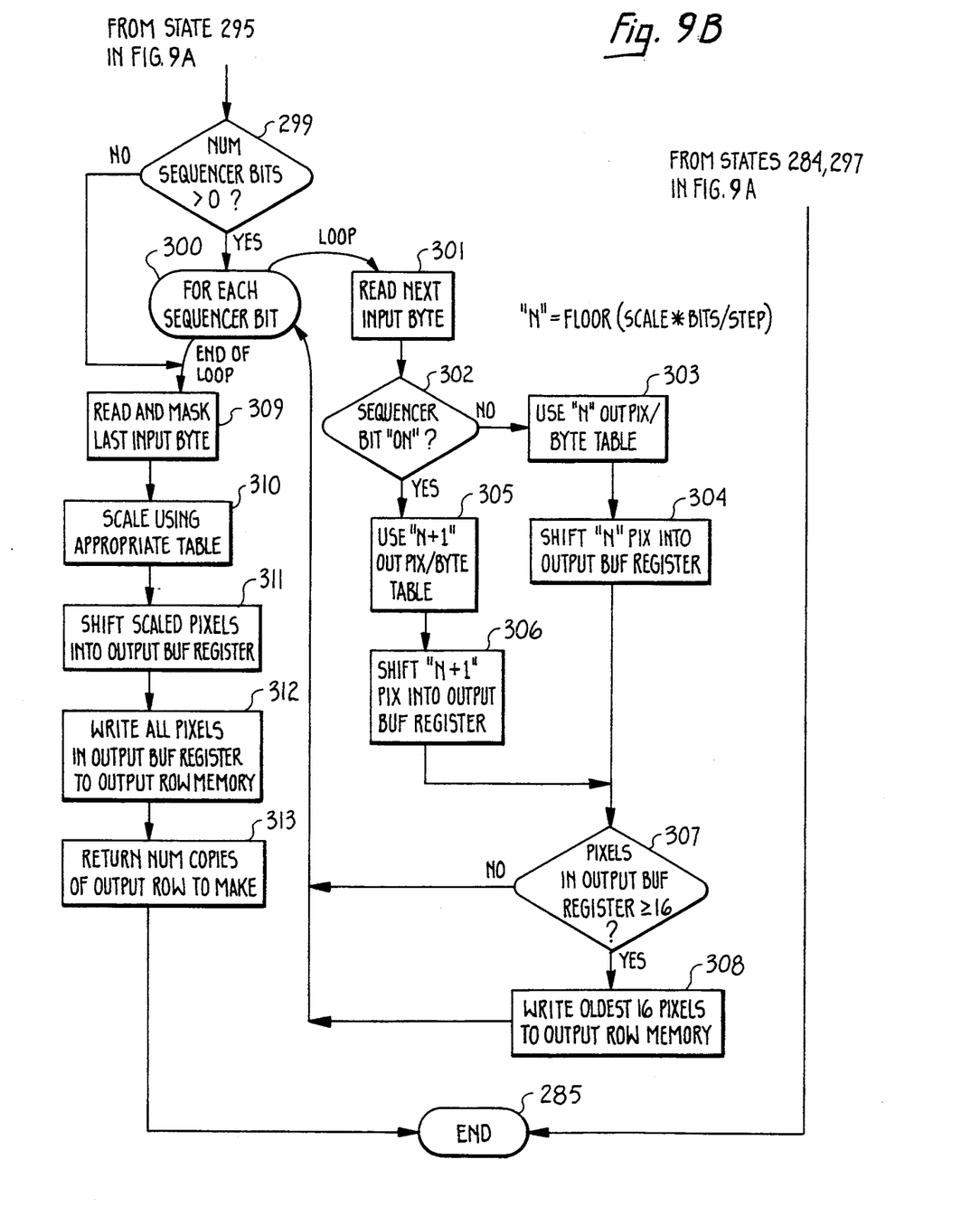

FIGS. 9A,B illustrate the control flow for the scale row function (FastEnlBinS) 204 referred to in the top-level control flow for the image scaler 200 (FIG. 5). The function 204 scales the input row of the binary image. The particular embodiment shown is an elucidation of "fast enlarged binary 8", which is an enlarging scaler function with eight input bits-per-step. The scale row function 204 is entered at a start state 280 and proceeds to a decision state 281 which is included by a row scaler 270.

The row scaler 270 comprises a number of states in the function 204 which can be implemented as a simple Bresenham algorithm. One skilled in the art will be familiar with the row scaler 270 without a further detailed explanation. Nonetheless, to show the basic mechanics of the row scaler 270, the image scaler 200, at the decision state 281, tests whether the row scale factor is greater than or equal to one or if the flush buffer condition is true. If either of those conditions are true, the number of output rows to create is calculated, by moving to a state 283 and proceeding to a decision state 284. At the state 284, if the row scale factor is less than one, the image scaler 200 is reducing the image in the vertical dimension, combining the input row with some number of the previous rows at a state 282, thus not producing an output row. In that case, the scale row function 204 terminates with a normal condition, without producing an output row, at end state 285.

If, to the contrary, an output row was produced by the row scaler 270, the image scaler 200 moves to a state 286 wherein the column stepping variables are initialized by the image scaler 200. Thus, the image scaler 200 is preparing to scale in the horizontal dimension. Transitioning to a state 287 the output buffer "register" (for instance, the "C" language allows the author to specify that certain variables will be stored in registers, if available) is pre-loaded with the unmodified boundary pixels. Here, the image scaler 200 will be modifying some of the bits in the first output byte. The output row may or may not begin on a double-word boundary, or whatever boundary is being used (preferably the boundary that is most efficient for the given computer).

After pre-loading the output buffer register with the bits that are not going to be modified, but are contained in the first output word, the image scaler 200 moves to a state 288 wherein the mask for the first input byte is read. A "byte" is used here because the illustrated implementation (FastEnlBin8) uses the eight input bit-per-step tables. Hence, the same discussion applies to a four input bit-per-step scaler by just replacing the word "byte" with "nibble".

Furthermore, by masking the first input byte, only the valid input pixels within the first byte are selected, as was calculated in the sequencer structure. The image scaler 200 then moves to a decision state 289 wherein the image scaler 200 tests whether the input row ends within the first byte. If the test is successful, the ending mask is applied to the first input byte at a state 290.

At this point, only the valid pixels within the first byte have been selected. If the input row does not end in the first byte, the image scaler 200 moves directly from the state 289 to a state 291 wherein the first input byte is scaled using the appropriate scaler table. (The correct scaler table to use for the first step was previously stored in the sequencer structure.) Proceeding to a state 292, the image scaler 200 shifts the scaled pixels that have been produced into the output buffer register. (Again, the number of output pixels to produce from that first step is stored in the sequencer structure.)

From the state 292, the image scaler transitions to a decision state 293 to check whether there are more than sixteen bits in the output buffer register. The number of bits in the output buffer register at this point is equal to the number of output bits that were shifted in at the state 292, plus the number of bits that were pre-loaded in the state 287.

If the sum of bits is greater than or equal to sixteen, control proceeds to a state 294 to write the oldest sixteen of those pixels to the output row memory and then proceeds to a decision state 295. Otherwise, assuming that the sum of bits is less than sixteen, the image scaler 200 moves to directly to the decision state 295. In the state 295, a test is made to determine whether the input row ends within the first byte. If the test succeeds, the image scaler 200 moves to a state 296 wherein any pixels that remain in the output buffer register are written out to the output row memory. Now, moving to a state 297 the number of copies to be made of the output row (calculated by the row scaler 270) is "returned", or output, to the image scaler 200. Thereafter, the image scaler 200 terminates the execution of the scale row function 204 at the end state 285.

Returning in the discussion to the decision state 295, if the input row does not end in the first byte, the image scaler 200 continues to a decision state 299 to check whether the number of sequencer bits is greater than zero. If the test is positive, the image scaler 200 enters a state 300 which is the beginning of a FOR-loop to loop execution over each sequencer bit. The FOR-loop is important for the efficient operation of the image scaler 200.

Now, for each sequencer bit, the image scaler 200 first moves to a state 301 to read the next input byte. Then, at a decision state 302, the value of the current sequencer bit is tested. If the current sequencer bit is "ON", the image scaler 200 moves to a state 305 and uses the N+1 output bits per step table. From the state 305, the image scaler 200 proceeds to a state 306 to shift N+1 pixels of the scaled pixels read from the scaler table into the output buffer register. Those pixels were gotten by using the input byte as an index into the N+1 output bit per step table, and that yields a result that is placed into the least significant bits of the output buffer register.

Alternatively, if, at state 302, the sequencer bit is "OFF", the scaler 200 moves to a state 303 to specify use of the N output bit per step table. Transitioning to a state 304, the resulting N scale pixels are shifted into the output buffer register. From either of the states 304 or 306, the image scaler continues to a decision state 307 to check whether the number of pixels (bits) in the output buffer register is greater to or equal to sixteen. If the number of pixels is greater than sixteen, the oldest sixteen pixels are written to the output row memory, and the scaler 200 continues the FOR-loop at the loop state 300.

It should be noted that in the preferred embodiment the output buffer register can hold up to 32 bits or pixels. By virtue of the design of the scaler tables, no more than 16 bits in a single step. Therefore, the output buffer register will never overflow if it is guaranteed that there are at least 16 bits of capacity remaining in the output buffer at the beginning of each iteration. That is why only the oldest sixteen pixels need be written from the output buffer register each time through the FOR-loop. The FOR-loop terminates after the last sequencer bit has been processed, and the image scaler 200 moves to a state 309. (In the appended source code for the image scaler 200, the FOR-loop is actually implemented as code that is replicated a maximum bit-string length times so as to reduce loop overhead and optimize access to the sequencer string.

The state 309 can also be reached if the number of sequencer bits is zero, and if there are no non-boundary steps. At the state 309, the last input byte is read and masked very similarly to the reading and masking of the first input byte already described, except that in this case, the valid bits, or the last valid bits, are on the opposite end of the byte from where they were on the input byte. Now, moving to a state 310, the image scaler 200 scales the proper number of bits using the appropriate table as specified in the sequencer structure. Then, proceeding to a state 311, the scaled pixels are shifted into the output buffer register.

Lastly, at a state 312, all of the pixels in the output buffer register are written to the output row memory. From the state 312, the image scaler moves to a state 313 and finally returns the number of copies of the output row to create, which was calculated in the row scaler 204, and the image scaler 200 terminates normally at the end state 285.

There has thus been described an image scaler for scaling and rescaling raster images at high speed. The present invention can be used by an image memory management system or an image processing application to reduce or enlarge images on a conventional computer.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A system for scaling an image prestored in a memory, comprising:

first table generation means for generating a first scaler table having a number of input bits and a first number of output bits wherein each input bit is indicative of a pixel in the prestored image and each output bit is indicative of a pixel in the image after scaling, the first table generation means storing the first scaler table in the memory, the first scaler table capable of having more than one input bit and more than one output bit simultaneously;

second table generation means for generating a second scaler table having the same number of input bits as the first scaler table and a second number of output bits different from the first number of output bits wherein each input bit is indicative of a pixel in the prestored image and each output bit is indicative of a pixel in the image after scaling, the second table generation means storing the second scaler table in the memory, the second scaler table capable of having more than one input bit and more than one output bit simultaneously;

sequencer means for generating a sequence having a bit string wherein the value of any one of the bits is indicative of either the first or second scaler table, the sequence having further data indicative of the alignment in the memory of valid bits in the image that may not be completely located within memory boundaries of the memory; and scaler means for selecting the first or second scaler table by reading the bit storing of the sequencer and applying only data aligned on memory boundaries to the selected table so that the image is scaled by a preselected scale factor that is interpolated by the selection of the scaler tables;

wherein the system is capable of scaling the image such that the preselected scale factor is a ratio of two integers, neither integer having a value of one.

2. The system defined in claim 1, wherein at least one of the first and second table generation means use the logical-OR operation on multiple input bits to produce a single output bit thereby resulting in a reduction in size of the image when data is applied by the scaler means.

3. The system defined in claim 1, wherein at least one of the first and second table generation means use the copy operation on a single input bit to produce multiple output bits thereby resulting in an enlargement in size of the image when data is applied by the scaler means.

4. The system defined in claim 1, wherein: the scaler means sequentially steps through the image; and the alignment data in the sequencer comprises the number of valid input bits in the first step and the number of valid output bits in the first step.

5. The system defined in claim 1, wherein: the scaler means sequentially steps through the image; and the alignment data in the sequencer comprises the number of valid input bits in the last step and the number of valid output bits in the last step.

6. A process for scaling an image, the process comprising the steps of:

providing the image in the form of rows of pixels, the pixels being represented by pixel data stored in a memory of a computer;

providing an input row buffer and an output buffer in the memory of a computer;

scaling each input row buffer according to a predetermined scale factor, the scaling including interpolating between scaling factors by selectively switching between more than one look-up table, each look-up table being prestored in the computer and having table input data values indicative of pixel data and table output data values indicative of scaled pixel data, wherein each table input value comprises a first number of bits and each table output value comprises a second number of bits, and wherein each table input value has a corresponding table output value stored in the memory such that providing pixel data matching an input data value to any one look-up table provides access in memory to the corresponding table output value; and copying one or more scaled rows to the output buffer in the memory of the computer.

7. The process for scaling as defined in claim 6, wherein the predetermined scale factor is the ratio of two integers, each integer having a value greater than one.

8. The process for scaling as defined in claim 6, wherein a first one of the look-up tables has a greater number of table input data values than table output data values.

9. The process for scaling as defined in claim 6, wherein a first one of the look-up tables has a greater number of table output data values than table input data values.

10. The process for scaling as defined in claim 6, wherein a first one of the look-up tables has 4 table input values.

11. The process for scaling as defined in claim 6, wherein a first one of the look-up tables has 8 table input values.

12. The process for scaling as defined in claim 6, wherein, for each of the look-up tables, the table input data values are selected so as to be aligned with byte locations in the memory of the computer.

13. A system for scaling an image represented by image data values stored in a memory, comprising:

a first scaler table stored in the memory, the first scaler table having a first number of input values and a second number of output values, wherein each input value is one of the image data values and each output value represents a part of the image after scaling, the first scaler table capable of having more than one input value and more than one output value simultaneously;

a second scaler table stored in the memory, the second scaler table having a third number of input values and a fourth number of output values, wherein each input value is one of the image data values and each output values represents a part of the image after scaling, the second scaler table capable of having more than one input value and more than one output value simultaneously;

a sequencer generating a data string in the memory, said data string having a plurality of elements, wherein the value of certain ones of the elements is indicative of either the first or the second scaler table, the data string having certain other elements indicative of the alignment in the memory of valid image data values that may not be completely located within memory boundaries of the memory; and a selector, selecting the first or second scaler table by reading the data string generated by the sequencer and applying image data values to the selected table so that the image is scaled by a preselected scale factor that is interpolated by the selection of the scaler tables;

wherein the system is capable of scaling the image such that the preselected scale factor is a ratio of two integers, neither of which has the value, one.

14. The system for scaling as defined in claim 13, wherein the image data values applied to the selected table are aligned on memory boundaries.

15. The system for scaling as defined in claim 13, wherein the first number of input values of the first scaler table is the same as the third number of input values of the second scaler table.

16. The system for scaling as defined in claim 13, wherein the second number of output values of the first scaler table is different from the fourth number of output values of the second scaler table.

17. A system for scaling an image prestored in a memory, comprising:

a first scaler table stored in the computer memory, the first scaler table having a number of input storage elements and a first number of output storage elements wherein each input storage element is indicative of a pixel in the prestored image and each output is indicative of a pixel in the image after scaling, the first scaler table capable of having more than one input and more than one output simultaneously;

a second scaler table stored in the computer memory, the second scaler table having the same number of input bits as the first scaler table and a second number of output bits different from the first number of output bits wherein each input bit is indicative of a pixel in the prestored image and each output bit is indicative of a pixel in the image after scaling, the second scaler table capable of having more than one input bit and more than one output bit simultaneously;

sequencer means for generating a sequence having a bit string wherein the value of any one of the bits is indicative of either the first or second scaler table, the sequencer having further data indicative of the alignment in the memory of valid bits in the image that may not be completely located within memory boundaries of the memory; and scaler means for selecting the first or second scaler table by reading the bit string of the sequencer and applying only data aligned on memory boundaries to the selected table so that the image is scaled buy a preselected scale factor that is interpolated by the selection of the scaler table;

wherein the system is capable of scaling the image such that the preselected scale factor is a ratio of two integers, nether of which has the value, one.

18. The system defined in claim 17, wherein each storage element is a bit.

* * * * *